United States Patent [19]

Daniels et al.

[11] Patent Number: 5,282,730
[45] Date of Patent: Feb. 1, 1994

[54] RETRACTABLE GAS INJECTION PIN FOR AN INJECTION MOLD

[75] Inventors: Vernon A. Daniels, Brooklyn; Anthony Gill, Rochester; William A. Nelson, New Baltimore, all of Mich.

[73] Assignee: Automotive Plastic Technologies, Sterling Heights, Mich.

[21] Appl. No.: 714,116

[22] Filed: Jun. 12, 1991

[51] Int. Cl.⁵ .................. B29C 45/16; B29C 45/40
[52] U.S. Cl. .................... 425/130; 264/334; 264/572; 425/444; 425/556
[58] Field of Search .............. 425/130, 436 R, 437, 425/444, 554, 556; 264/334, 336, 572, 335

[56] References Cited

U.S. PATENT DOCUMENTS

| | | | |
|---|---|---|---|
| 4,009,978 | 3/1977 | Hanning | 425/444 |
| 4,555,225 | 11/1985 | Hendry | 425/4 R |
| 4,740,150 | 4/1988 | Sayer | 425/542 |
| 4,917,594 | 4/1990 | Gellert et al. | 425/549 |
| 4,990,083 | 2/1991 | Bernhardt | 425/547 |

Primary Examiner—Tim Heitbrink
Attorney, Agent, or Firm—Howard & Howard

[57] ABSTRACT

An improved injection molding system having gas injected through an injection pin associated with an ejector pin. The injection pin is movable between a retracted position at which it is sealed from the mold cavity, to an extended position where it delivers gas into the cavity. In a first embodiment, the injection pin is powered by a cylinder to move between the extended and retracted positions. In a second embodiment, the injection pin is actuated by the pressurized gas. The improved system injects gas into a mold cavity without the requirement of a separate injection aperture. Further, the inventive injection pins have outlet ports sealed from the flow of plastic until the injection pin is extended to deliver the gas.

7 Claims, 3 Drawing Sheets

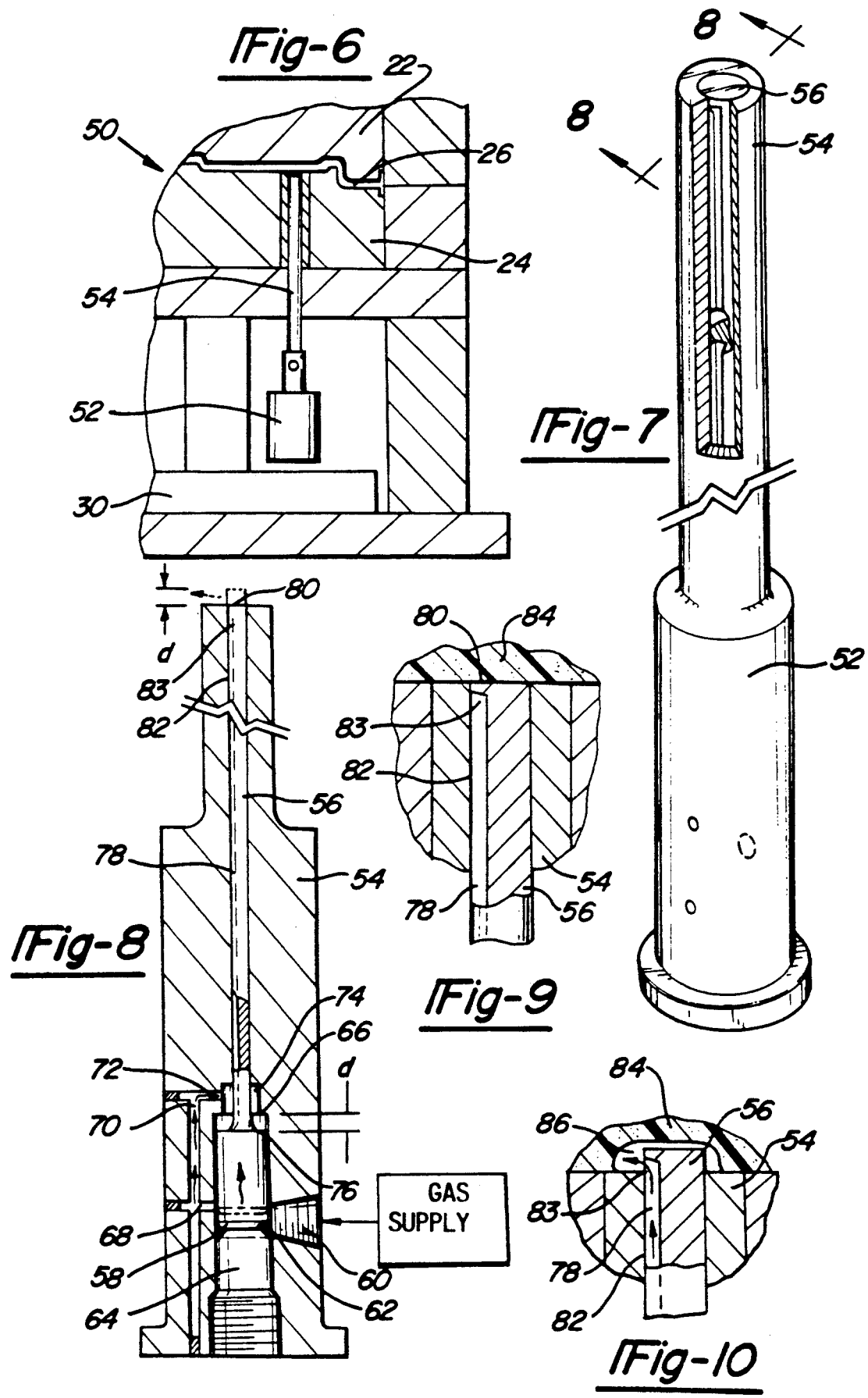

RETRACTABLE GAS INJECTION PIN FOR AN INJECTION MOLD

BACKGROUND OF THE INVENTION

This application in general relates to a unique system for injecting pressurized gas or fluid into a mold cavity in a plastic injection molding system.

Various methods are known to inject gas into a plastic injection molding system to form hollow portions within a part. Typically, gas is injected through an injection pin extending through an opening in the mold. The prior art injection pin sometimes extended through a separate gas aperture, which required another opening in the mold. This complicated the structure of the mold. One alternative in the prior art was to inject the gas through the plastic injection opening, or sprue. This complicated both the structure of the plastic injection opening and the flow of plastic into the system. Further, such structure often resulted in the injection pin gas passages becoming clogged. It would be desirable to reduce the number of openings in the mold body to reduce the complexity of the mold, and further to result in a smoother surface for the parts formed within the mold.

Prior art injection pins typically have a small gas passage leading into the mold. Molten plastic may enter and clog this passage. The gas passage may have a check valve disposed in it to prevent back flow. This complicates the structure of the injection pin and does not prevent plastic from entering and clogging the tip of the gas passage.

It is known to mount a movable injection pin within a mold that moves from a retracted position outside of the mold cavity, to an extended position within the cavity to inject the pressurized gas. With such systems, the injection pin typically moves through a separate aperture in the mold, thus requiring an additional mold opening. Further, such injection pins typically have a gas outlet at an axial end of the pin which faces the mold cavity. The fluent plastic entering the cavity may clog this open end of the injection pin.

SUMMARY OF THE INVENTION

In a disclosed embodiment of the present invention, an injection pin is mounted within an ejector pin which moves to force a part out of the mold cavity. The injection pin injects pressurized gas or fluid into the cavity while the part is being formed. The ejector pin is normally moved after the part is formed to force the part outwardly of the cavity. The injection pin moves through the ejector pin aperture and does not require an additional aperture in the mold, reducing the complexity of the mold.

In a preferred embodiment of the present invention, the injection pin is movable relative to the ejector pin between retracted and extended positions. At the extended position, the injection pin extends into the cavity for injection of gas or fluid. At the retracted position, the pin is retracted outwardly of the cavity such that gas or fluid flow from the injection pin to the cavity is blocked. More preferably, the injection pin is received within a bore, and outlet passages which direct pressurized gas or fluid into the mold cavity are sealed against the bore wall when the injection pin is in its retracted position. Thus, fluent plastic does not enter the gas passage of the injection pin.

In one disclosed embodiment of the present invention, the injection pin serves a dual purpose, and also is the ejector pin which forces the part outwardly of the mold. This ejector/injection pin moves with an ejector pin plate that moves a plurality of ejector pins upwardly once the mold has been opened to force a part outwardly of the mold. A separate cylinder on the ejector pin plate is selectively actuated to move the pin forwardly into the mold cavity to an extended position independent of the ejector pin plate for delivering gas or fluid to the mold cavity.

In another embodiment of the present invention, the injection pin is slidably received within an ejector pin body. Pressurized gas delivered toward the mold cavity acts upon a surface of the injection pin to force it to an extended position where it delivers gas into the cavity.

These and other objects and features of the present invention can be best understood from the following specification and drawings of which the following is a brief description.

BRIEF DESCRIPTION OF THE DRAWINGS

FIG. 6 is a partial cross-sectional view similar to that shown in FIG. 1, but showing a second embodiment of the present invention.

FIG. 7 is a perspective view of a second embodiment injection pin.

FIG. 8 is a cross-sectional view along line 8—8 as shown in FIG. 7.

FIG. 9 is a cross-sectional view somewhat similar to that shown in FIG. 4, but showing the second embodiment.

FIG. 10 is a view similar to that shown in FIG. 9 but showing a subsequent step in the formation of a part with the second embodiment system.

DETAILED DESCRIPTION OF A PREFERRED EMBODIMENT

Figure 1:
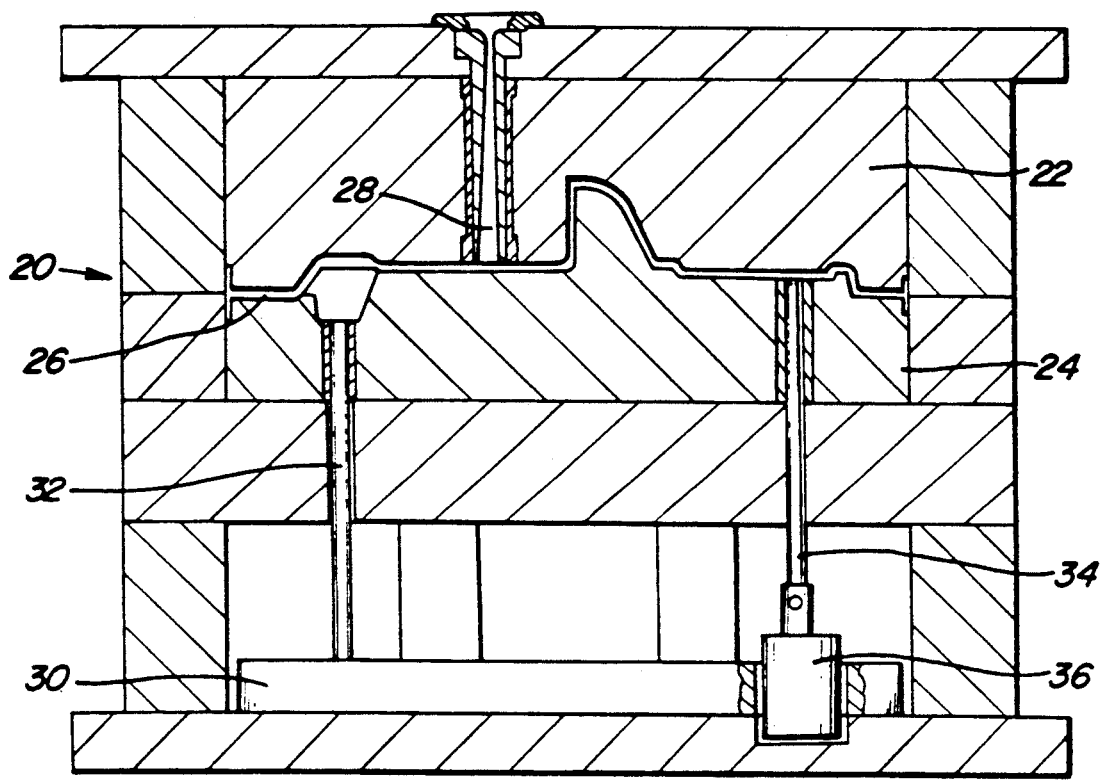
FIG. 1 is a partially schematic cross-sectional view of an injection molding system according to the present invention.

An injection molding system 20 is illustrated in FIG. 1. First mold half 22 is brought into contact with second mold half 24 to define cavity 26. Fluent plastic is injected through plastic injection plastic injection aperture or opening 28 into cavity 26 to form a part. After the part has hardened, first mold part 22 is removed from the second mold part 24. The formed part typically remains on second mold part 24. Ejector pin plate 30 is then forced upwardly such that ejector pins 32 and 34 force the part off of second mold part 24. In general, this structure is well known in the prior art and is thus shown somewhat schematically. The present invention relates to the structure of ejector pin 34. Ejector pin 34 includes a separate cylinder 36 such that it moves independently of ejector pin plate 30. Cylinder 36 may be hydraulic, pneumatic, or any other type of cylinder.

Figure 2:
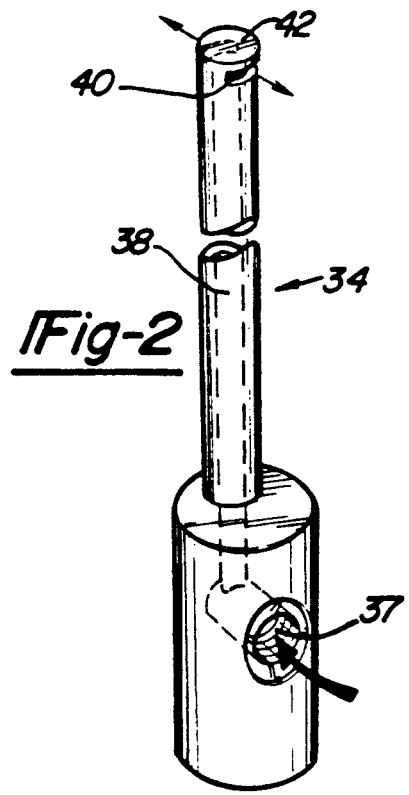
FIG. 2 is a perspective view of an ejector/injection pin according to the present invention.

As shown in FIG. 2, ejector pin 34 includes a radial port 37 which receives pressurized gas and delivers it through an axial passage 38 to a pair of spaced outlets 40 near an end 42. Ejector pin 34 thus performs the dual purpose of ejecting a part off of mold part 24, while also injecting pressurized gas into cavity 26 during molding.

Figure 3:
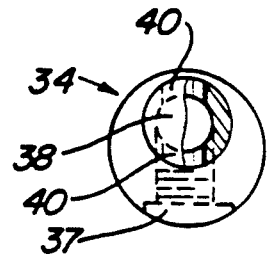
FIG. 3 is an end view of the ejector/injection pin shown in FIG. 2.

FIG. 3 is a top view of ejector/injection pin 34. Radial port 37 extends through the outer periphery and communicates with axial passage 38. Axial passage 38 extends to a pair of spaced outlets 40.

Figure 4:
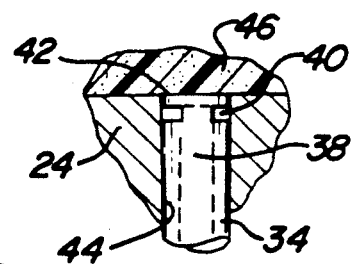
FIG. 4 is an enlarged partial cross-sectional view of a portion of the mold illustrated in FIG. 1.

As shown in FIG. 4, pin 34 is slidably received within a bore or ejector pin aperture formed by cylinder inner wall 44. End 42 of pin 34 forms a relatively smooth surface with the remainder of second mold part 24. Openings 40 abut wall 44. Thus, fluent plastic 46 within cavity 26 does not communicate with openings 40 in ejector pin 34.

Figure 5:
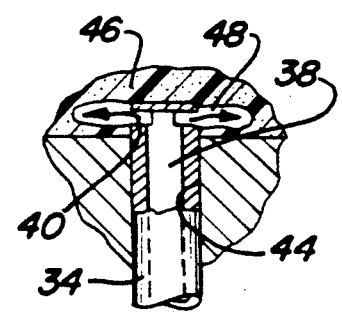
FIG. 5 is a view similar to FIG. 4, but showing a subsequent step in the formation of a part with an inventive system.

FIG. 5 shows the delivery of pressurized gas into cavity 26 by pin 34. When it is desired to deliver gas into cavity 26, cylinder 36 is actuated to extend pin 34 slightly upwardly relative to plate 30 and second mold part 24. As shown in FIG. 5, openings 40 no longer abut wall 44. Instead, openings 40 are now within fluent plastic 46 and pressurized gas is delivered outwardly to form hollow 48.

A method of molding a part within system 20 will be described with reference to FIGS. 1-5. First mold part 22 is brought downwardly into contact with second mold part 24 to form cavity 26. Plastic is injected into cavity 26 through opening 28. Pin 34 is then extended by cylinder 36 slightly upwardly into cavity 26. Pressurized gas is injected through openings 40 into cavity 26 forming hollow 48 in plastic 46. Once the article has cooled sufficiently to be self supporting, the pressurized gas in cavity 48 may be vented back through the openings 40 in the pin 34. The pin 34 can then be retracted and the article ejected by removing the first mold part 22 from the second mold part 24 and moving ejector plate 30 upwardly such that ejector pins 32 and 34 force the part outwardly of second mold part 24. The hole in the article from pin 34 can either remain or be filled with plastic as desired.

Although it is preferred that the pressurized gas is vented back through pin 34, other methods of venting are acceptable. For example, pin 34 can be retracted while at least a portion of the plastic is still fluent. As pin 34 is retracted, fluent plastic may flow into and seal the hole left by pin 34. After the article has cooled sufficiently to be self supporting, the article can be removed from the mold in the same manner as described above. It will, however, be necessary to vent the pressurized gas contained within the article prior to, or essentially at the same time, as opening the mold. The pressurized gas may be vented by methods well known in the art, such as, for example, cutting or drilling a small opening in the article or by venting through the sprue as the mold is opened.

The inventive system injects gas into cavity 26 without the requirement of an additional aperture, or without complicating the structure of the plastic injection opening 28. Outlets 40 in ejector/injection pin 34 are sealed during injection of the plastic and are only opened during delivery of the gas, thus preventing ingress of plastic into openings 40.

A second embodiment injection molding system 50 is shown in FIG. 6. First mold part 22 and second mold part 24 define a cavity 26. An ejector pin structure 52 including cylinder 54, is movable with an ejector pin plate 30.

As shown in FIG. 7, cylinder 52 includes an outer cylinder 54 and an inner injection pin 56 slidably received within cylinder 54. The combination of cylinder 54 and pin 56 serve the function of an ejector pin 52 to force a part outwardly off of mold half 24.

As shown in FIG. 8, injection pin 56 has a first end face 58 adjacent gas supply port 60 in cylinder 54. End face 58 is essentially configured as a truncated cone facing a chamber 62. Pressurized gas is delivered to port 60 and into chamber 62 where it acts upon end face 58. End face 58 abuts stop 64 to define a retracted position of injection pin 56. Pressurized gas in chamber 62 acts against end face 58 and forces injection pin 56 upwardly through distance d until it abuts second stop 66. Gas from port 60 communicates through radial passage 68 to axial passage 70, second radial passage 72, and into chamber 74. Pressurized gas in chamber 74 applies a force on intermediate piston face 76 which tends to force injection pin 56 towards the retracted position, and against the force applied to end face 58. End face 58 has a much greater surface area than piston face 76, however, and thus the force on end face 58 overcomes the force on intermediate face 76. Once injection pin 56 abuts stop 66, the effective surface area of intermediate face 76 which faces chamber 74 is much smaller. Thus, the force on face 76 is small in comparison to the force on end face 58. Intermediate face 76 may have a surface ratio of 1:10 compared to end face 58.

When injection pin 56 is in the extended position moved upwardly through the distance d, gas may be delivered from chamber 74 and into notch 78 at the outer periphery of injection pin 56. It then flows upwardly towards the second axial end 80 of injection pin 56. Injection pin 56 is slidably received within a cylindrical bore formed by an inner wall 82 in cylinder 54. An outlet end 83 of notch 78 is sealed against inner wall 82 when injection pin 56 is in the retracted position.

Injection pin 56 is shown in the retracted position in FIG. 9. Outlet 83 of notch 78 abuts inner wall 82. Plastic 84 within cavity 26 thus does not enter outlet 83, or notch 78. Instead, end 80 of injection pin 56 defines a flat surface with the remainder of second mold part 24.

When it is desired to inject gas into cavity 26, gas is supplied to port 60. Pressurized gas forces injection pin 56 upwardly through distance d. As shown in FIG. 10, gas can thus pass along notch 78 and outwardly of outlet 83 into the mold cavity 26. A cavity 86 thus forms in plastic 84. By opening line 60 to ambient pressure or by pulling a vacuum on line 60, pin 56 can be returned to the retracted position. By reducing the pressure on line 60, at least part of the pressurized gas contained in cavity 86 will be vented. Preferably sufficient gas is vented through pin 56 to allow the mold to be opened without any further reduction of the pressure within the article. In some cases, however, it may be necessary to further reduce the pressure of the gas contained within the article. If the pin 56 is retracted after the article has cooled sufficiently to be self supporting, the gas can vent through the hole left by pin 56. On the other hand, if pin 56 is retracted while the plastic is still sufficiently fluid to flow into and seal the hole left by pin 56, alternative methods of venting, as noted above, can be used. The preferred method of venting is through pin 56 and line 60.

Figure 11:
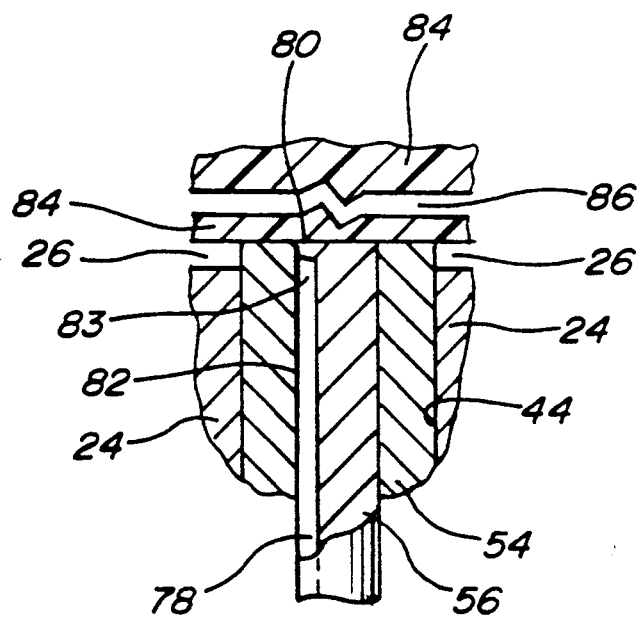
FIG. 11 is a view similar to that shown in FIG. 9 but showing the subsequent step in the ejection of a part with the second embodiment system.

FIG. 11 illustrates the ejection of the part formed by resin 84 and having cavity 86 therein. In this figure, the injector pin 56 would have been retracted into cylinder 54 while the resin 84 was still sufficiently fluid to flow into and seal the hole left by injector pin 56. When the ejector pin structure 52 (see FIG. 7) is moved into the mold cavity 26, the surface 80 formed by the end of the cylinder 54 and the injector pin 56 effectively pushes the plastic part away from the mold half 24 and thereby ejects the plastic part from the mold.

The features of mold systems 20 and 50 other than the ejector and injection pins are disclosed somewhat schematically and may be of types well known in the art. Further, although the systems are disclosed for forming hollow parts, it should be understood that the broad features of this invention extend to gas delivery for any purpose. The pins 34 and 56 may move a distance of ⅛-3/16 inches between the extended and retracted positions, and typically a distance on the order of ¼ inch.

Preferred embodiments of the present invention have been disclosed, however, a worker of ordinary skill in the art would recognize that certain modifications would come within the scope of this invention. For that reason the following claims should be studied in order to determine the true scope and content of this invention.

We claim:

1. An injection molding apparatus comprising:
   a mold body defining a cavity at an inner periphery for forming a part;
   an aperture for delivering fluent plastic into said cavity, said aperture adapted to be connected to a source of fluent plastic;
   a source of pressurized gas selectively communicating with said cavity through a passage in an injection pin, said injection pin being movable between an extended position where said passage communicates with said cavity to a retracted position where said passage does not communicate with said cavity, said injection pin being received within a bore defined by a cylinder inner wall, said passage having an outlet abutting said inner wall when in said retracted position to block communication between said outlet and said cavity; and
   said injection pin being moved between said extended and retracted position by a force from said gas delivered to said cavity, wherein said injection pin has a first end removed from said cavity and a second end selectively extended into said cavity, said first end acted upon by said gas to move said injection pin to said extended position, a piston face defined on said injection pin at an intermediate position between said first end and said second end, said piston face being acted upon by said gas to apply a force tending to move said injection pin to said retracted position, said piston face having a smaller surface area than said first end of said injection pin such that the force from said gas being applied to said first end overcomes the force of said gas applied to said piston face and said injection pin is forced to said extended position.

2. A molding apparatus as recited in claim 1, wherein said injection pin is moved between said extended and retracted positions by a force from said gas delivered to said cavity.

3. A molding apparatus as recited in claim 1, wherein said injection pin is mounted within a bore defined by a cylinder inner wall, and a source of gas communicates with a chamber adjacent said first end of said injection pin to force said injection pin towards said cavity and to said extended position, the movement of said injection pin towards said mold cavity uncovering a port in said inner wall such that said gas communicates into said port and is delivered to an intermediate chamber adjacent said piston face, said gas then being delivered to said outlet and into said mold cavity.

4. A molding apparatus as recited in claim 3, wherein gas delivered past said piston face communicates with a notch formed at an outer periphery of said injection pin, said notch extending axially along said injection pin towards said second end to said outlet, said outlet positioned axially between said first and second ends, such that said second end blocks communication between said outlet and said mold cavity when said injection pin is in said retracted position.

5. A molding apparatus as recited in claim 1, wherein at least one ejector pin is selectively movable into said mold cavity to force a part outwardly of said cavity, said injection pin is movable with said at least one ejector pin.

6. A molding apparatus as recited in claim 1, wherein said injection pin is moved by a cylinder actuated by a fluid other than said gas between said extended and retracted positions.

7. A molding apparatus as recited in claim 6, wherein said injection pin has a central passage delivering gas towards an end of said injection pin adjacent said mold cavity, said central passage communicating with at least one radial outlet port which delivers said gas into said mold cavity, said radial outlet port abutting said inner wall when said injection pin is in said retracted position.

* * * * *